(12) United States Patent
Acar et al.

(10) Patent No.: US 7,930,332 B2
(45) Date of Patent: Apr. 19, 2011

(54) WEIGHTED ENTROPY POOL SERVICE

(75) Inventors: Tolga Acar, Sammamish, WA (US);
Daniel B. Shumow, Seattle, WA (US);
Andrew S. Tucker, Seattle, WA (US);
Carl M. Ellison, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 11/690,758

(22) Filed: Mar. 23, 2007

(65) Prior Publication Data
US 2008/0256151 A1 Oct. 16, 2008

(51) Int. Cl.
*G06F 1/02* (2006.01)
(52) U.S. Cl. .................................................. 708/250
(58) Field of Classification Search ........... 708/250–256
See application file for complete search history.

(56) References Cited

U.S. PATENT DOCUMENTS
6,253,223 B1 * 6/2001 Sprunk .................... 708/250

OTHER PUBLICATIONS

Ferguson, N. et al., Practical Cryptography, *Wiley Publishing, Inc.*, 2003, ISBN 0-471-22894-X, 410 pages.
Kelsey, J. et al., "Yarrow-160: Notes on the Design and Analysis of the Yarrow Cryptographic Pseudorandom Number Generator," *Selected Areas in Cryptography, Proc. SAC*, 1999, 1758, 13-33.

* cited by examiner

*Primary Examiner* — Tan V Mai
(74) *Attorney, Agent, or Firm* — Woodcock Washburn LLP

(57) ABSTRACT

A weighted entropy pool service system and methods. Weights are associated with entropy sources and are used to estimate a quantity of entropy contained in data from the entropy sources. An interface is optionally provided to facilitate connecting user entropy sources to the entropy pool service. The quantity of entropy contained in the system is tracked as entropy is distributed to entropy consumers. A persistent entropy pool state file stores entropy across system restarts.

20 Claims, 5 Drawing Sheets

WEIGHTED ENTROPY POOL SERVICE

BACKGROUND

A wide variety of computing processes require a source of randomness. Random number generators or pseudo-random number generators are used in applications such as, for example, gaming, image processing, scientific simulation, financial modeling, program testing, and computer security. Many security systems, such as those used in cryptography, digital signatures, and secure communications protocols, are built on strong cryptographic algorithms dependent on generating secret, essentially unguessable quantities for use in cryptographic keys, passwords, blinding of values in certain protocols, and the like.

Random sources can be classified as either pseudo-random or true random. Pseudo-random sources are deterministic systems designed to imitate true random sources. A basic criterion for a random source is that an attacker having full knowledge of the hardware and software being used cannot predict the bits a user will use next even if the attacker knows all of the bits used previously.

Many traditional sources of random data use pseudo-random number generators ("PRNGs") which are triggered with an initializing seed value and use deterministic logical or numerical operations to produce a sequence of values. Being deterministic and finite, PRNGs are inherently periodic. Applications developers who require random seeming data must take pains to provide an unguessable seed value and an algorithm with a sufficiently long period. A PRNG may be used to generate a cryptographic key. As an example, if an 8 bit seed value is used to trigger a PRNG to generate a 128 bit cryptographic key, an attacker need not try all $2^{128}$ ($\approx 3.4 \times 10^{38}$) cryptographic keys, but instead need only search through keys generated with any of the $2^8$ (=256) possible seed values. As this example indicates, no matter how strong or complex the manipulation of data inside a deterministic PRNG, its use for generating cryptographic keys may not be any more secure cryptographically than the (possibly somewhat limited) selection of the seed value.

Various devices and processes that may be associated with a computing device can be a source of true random data. Some examples are: a radioactive source emitting particles to an absorbing counter having a computer readable output; quantum effects in a semiconductor such as a noisy diode; electronic noise from an unplugged microphone; air turbulence within a sealed, dedicated disk drive; and some system events such as mouse strokes or timing between keystrokes.

Information entropy for a random bit stream may be defined as $$H = -\sum_{x} P(x) \log_2(P(x)) \text{ (bits)}$$

where x is a possible string in the stream of bits and P(x) is the probability of the occurrence of x in the bit stream. The entropy rate, J, for strings of length |x| may be defined as J=H/|x| (entropy bits/bit of source).

The absolute entropy of a bit stream may be defined as the minimum value obtained by J, where the minimum is taken over all possible string lengths |x|. Thus E represents a guaranteed minimum entropy per bit of source data regardless of symbol length.

In practice, one is concerned with private entropy, by which we mean bits of information not known by an attacker. One can compute private entropy as the conditional entropy, after some information about the data from the source has become known by an attacker (at least potentially). For example, if an attacker is able to capture some bits of data from an entropy source, those captured bits contain no private entropy. As another example, the daily closing value of the Dow Jones Industrial Average probably has some entropy (because at least some of its digits are unknowable in advance), but has no private entropy because the information is readily knowable to an attacker.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An entropy pool service architecture with pluggable entropy sources is described herein. The architecture associates qualitative descriptions in the form of weights to entropy sources in order to quantify the entropy gathered from the sources by an entropy pool. Entropy from system and user entropy sources may be mixed so as to provide enhanced certainty regarding the quality of entropy in the entropy pool. An interface may facilitate the use of pluggable system and user entropy sources. The entropy pool service may preserve the state of the entropy pool across operating system boots.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in logic realized with hardware or software or, where appropriate, with a combination of both. Thus, the methods and apparatus, or certain aspects or portions thereof, may take the form of program code (e.g., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system, or may be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 1:
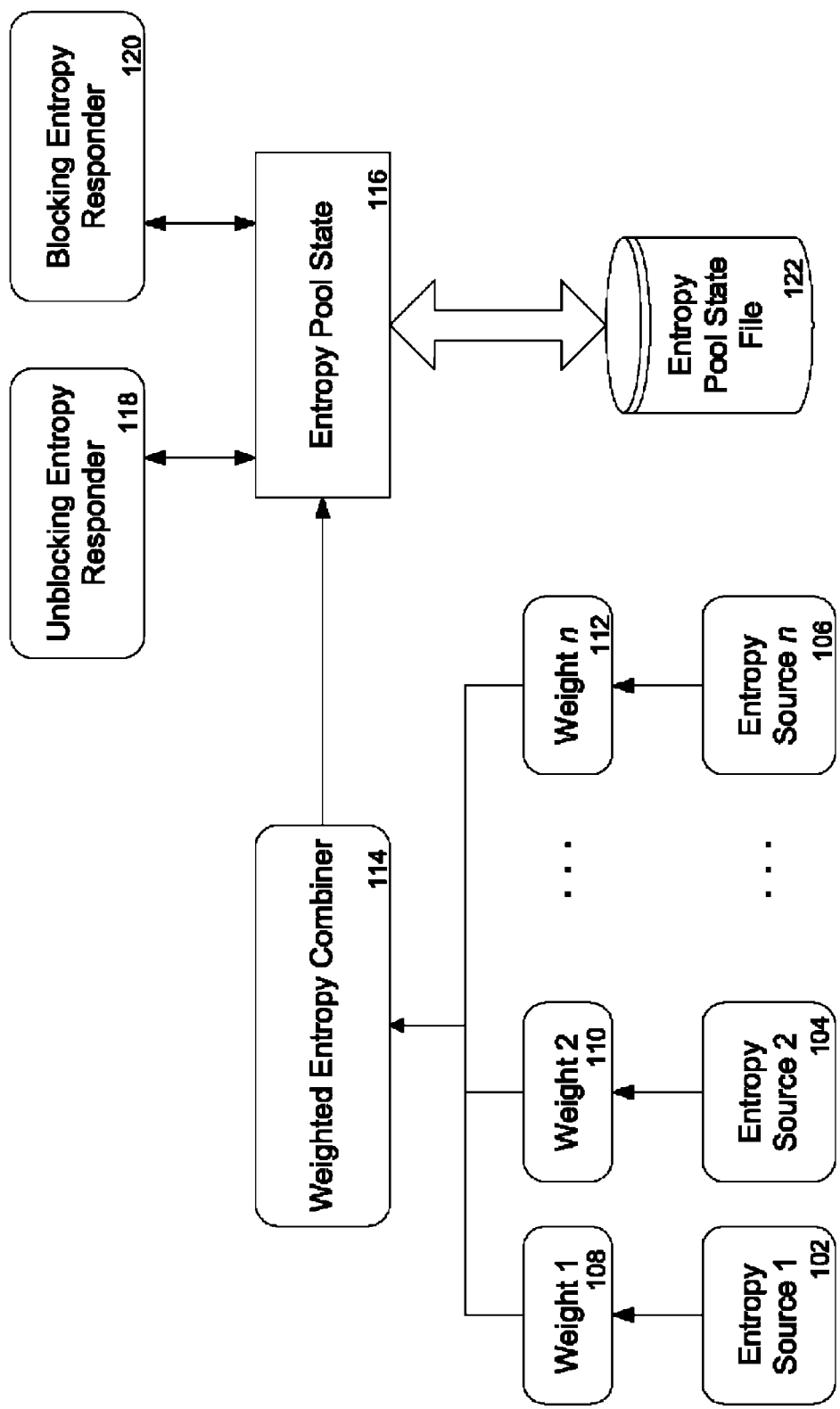
FIG. 1 is a block diagram of a system having a weighted entropy pool service.

Various methods and systems are described for providing an entropy service having pluggable and/or weighted entropy sources. FIG. 1 depicts a block diagram of a system having an embodiment of an entropy pool service architecture such as described herein. An entropy pool service is a source of random data for use by applications. One bit of data can have anywhere between one bit of entropy, meaning the data bit is completely unpredictable, and zero bits of entropy, meaning the data bit is completely predictable. A random bit having a ¾ probability of being a "0" and a ¼ probability of being a "1" has $-(¾ \log_2(¾) + ¼ \log_2(¼)) \approx 0.811$ bits of entropy. The entropy pool service gathers entropy from a collection of one or more entropy sources 102, 104, 106. Each entropy source comprises a source of data, preferably containing some randomness, and a hashing component for distributing the randomness within the source data throughout the source data. A wide variety of data sources may serve as sources of entropy. For example, system information such as various system clocks or timers, how many page faults have occurred, how much free RAM is available, occupied disk drive space, free disk drive space, system lookaside information, system interrupt information, and the like each may provide some entropy. Network information such as numbers of packets received or sent, network packet timings may provide some entropy. The timing or content of mouse movements, keystrokes, and other similar external events may provide some entropy. Specially designed hardware devices may be used to generate random data.

The private entropy in data from a source will often be less than the quantity of data available from a source. For example, the high order bits of a system clock may be knowable to an attacker and thus may not contain private entropy. Additionally, a system clock resolution may not be as fine as the nominal clock resolution, leading to constant low order bits in system clock data, thereby reducing the amount of private entropy in the clock data.

As another example, a cat walking on a keyboard may generate unpredictable patterns of keystrokes, but the data from the keystrokes may contain patterns due to the order of lifting legs and may have limitations on variability due to the limited range of motion due to the length of the cats legs. Data from a mouse track may have a certain amount of predictability due to the tendency of mouse movement to exhibit some inertia or an attacker knowing a target location for a mouse click, but the lowest order bit of the mouse location generally shows a significant level of noise and may be a suitable source of private entropy.

A hardware random number generator is a piece of special purpose electronic hardware that may be connected to a computer system and produces true random output. Some examples of hardware random number are based on amplified noise generated by an electronic circuit, environmental acoustic noise, quantum effects in a semiconductor, timing of radioactive decays, and lava lamps. Hardware random number generators can be good sources of random data and may have private entropy rates at or near to their data rates.

Existing hardware sources on a computing system may provide sources of random data. Events generated by a keyboard, mouse, or network card, such as mentioned above, may provide some random data. A sound or video input with no source plugged into it may be a source of random noise data. Disk drives have small random fluctuations in their rotational speed due to chaotic air turbulence that may be measured by low level disk seek time instrumentation.

Once an entropy source gathers data from its source of data, the harvested data sample is preferably combined so as to distribute any randomness within the data sample throughout the data sample. One common procedure for combining is to use a hashing function. It is desirable for a combiner function to have each output bit functionally dependent on all input bits and functionally independent of all other output bits. Some examples of such hash functions are Message-Digest algorithm 5 ("MD5") and Secure Hash Algorithm ("SHA"). By hashing the source data in this manner, one need not be concerned with determining exactly which bits of the source data contain private entropy. If a source data sample contains k bits of private entropy, then any k bits of a properly hashed sample will contain k bits of private entropy no matter where within the source data sample those bits are located.

The data samples from the entropy sources 102, 104, 106, possibly hashed, are each associated with a weight 108, 110, 112 respectively. In general the weights 108, 110, 112 represent estimates of the quality of the entropy sources 102, 104, 106. In some embodiments, a weight may be an estimate of the number of bits of usable private entropy per bit of data from the data source. A weight 108, 110, 112 may be asserted by an entropy source 102, 104, 106 or may be assigned by a weighted entropy combiner 114. In general, sources that are expected to be somewhat predictable, such as, for example, a system clock, might receive little weight.

The weights 108, 110, 112 assigned to entropy sources 102, 104, 106 may be determined with consideration of various qualities of the sources as they relate to the amount of private entropy expected to be contained in data from the sources, especially those that relate to the randomness or detectability of the data from the source. Some entropy sources are better than others in unguessability or in being inaccessible to an attacker.

In some embodiments, data from an entropy source may be analyzed to estimate the amount of entropy contained in the data, and a weight assigned to the entropy source based on the data analysis. The analysis may be continued over time as the entropy source provides data and the weight assigned to the entropy source may be adjusted in response to the continued analysis. Alternatively, some weights may be determined experimentally. For example, preliminary experiments with mouse track data indicate approximately one bit of conditional entropy per 16 bit mouse data sample when the mouse is being moved. This estimated weight is somewhat low, in part due to the predictability of mouse tracks (such as inertia, as mentioned above). In this example, an entropy source using mouse data samples might be assigned a weight of 1/16 bit of entropy per bit of data sample. Note that even though an attacker might know the endpoint of a mouse track, for example if the attacker provided a dialog box to click on, the attacker likely does not know the path taken to the endpoint. Data from an entropy source 102, 104, 106 is combined with its associated weight 108, 110, 112 is fed to the weighted entropy combiner 114, as described more fully below.

Figure 2:
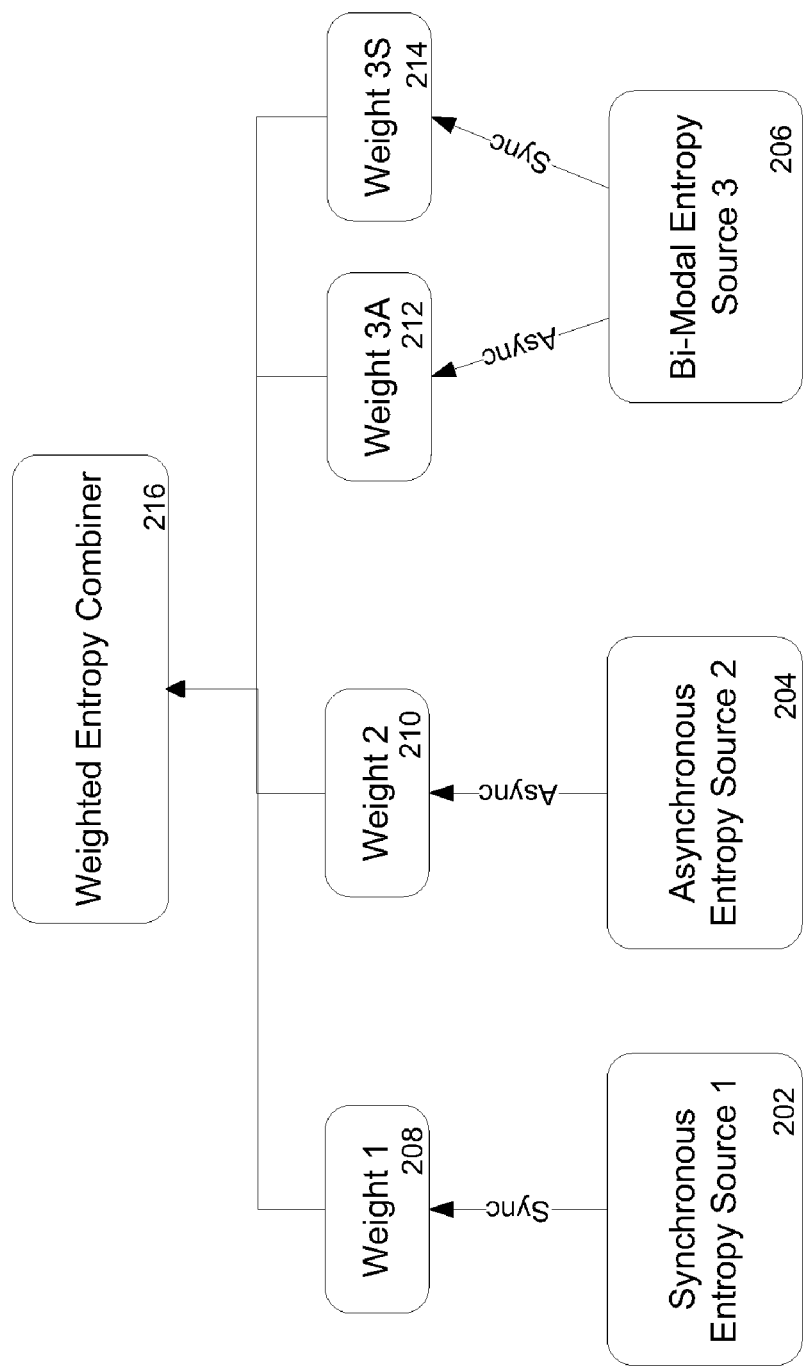
FIG. 2 is a block diagram depicting synchronous, asynchronous, and bi-modal entropy sources.

Data from an entropy source may be provided in a synchronous mode, for example periodically, on a predetermined schedule, or otherwise on demand. Alternatively, data from an entropy source may be provided in an asynchronous mode, for example as data samples are generated. FIG. 2 depicts a synchronous entropy source 202 with its associated weight 208, an asynchronous entropy source 204 with its associated weight 210, and a bi-modal entropy source 206 with its associated weight for asynchronous mode 212 and its associated weight for synchronous mode 214. In general, the weight assigned to an entropy source may depend on its mode. For example, if mouse position data is used in a synchronous mode, it may be given negligible or zero weight because the mouse may not move at all for very long periods of time and thus the mouse position data will generally contain very little or no private entropy. On the other hand, if the mouse position data is used in an asynchronous mode, generating data samples only when the mouse is in motion, the mouse position data may contain some private entropy which would be reflected in the weight assigned to the source in asynchronous mode. Data from the entropy sources 202, 204, 206, possibly hashed, are associated with corresponding weights 208, 210, 212, 214 and fed to a weighted entropy combiner 216.

Referring again to FIG. 1, the weighted entropy combiner 114 receives data samples from entropy sources 102, 104, 106, along with their associated weights 108, 110, 112. Each data sample may or may not have been hashed in the entropy source 102, 104, 106 before being sent to the weighted entropy combiner 114.

In one embodiment, the weighted entropy combiner 114 places the incoming data samples into a buffer. The buffer may be configured, for example, as a circular buffer. The weighted entropy combiner 114 may optionally hash the data before inserting it into the buffer. The weighted entropy combiner 114 may maintain a count of how much entropy is in the buffer. The count is incremented by the amount of entropy in the incoming data sample, determined by considering the amount of data in the data sample and its associated weight. As an example, if the data sample contains 32 bits and its weight is 1/4 bit of entropy per bit of data, then 8 bits of entropy are deemed to have been added to the buffer. The data in the buffer may be hashed when data is added to the buffer or when data is extracted from the buffer. Proper hashing of the buffer contents insures that any entropy contained in the buffer is distributed throughout the buffer.

In another embodiment, the weighted entropy combiner 114 maintains a count of the amount of entropy contained in a buffer. When the weighted entropy combiner 114 receives a data sample and associated weight, it determines the amount of entropy contained in the data sample based on the weight and sample size. The data sample may be hashed, especially if it was not hashed by the entropy source that provided the data sample, and a number of bits equal to the amount of entropy in the sample is extracted from the sample and inserted in the buffer. Alternatively, the entire data sample may be inserted into the buffer, the buffer contents hashed, the count of entropy contained in the buffer incremented by the amount of entropy in the data sample.

Data from the weighted entropy combiner 114 is moved to an entropy pool state 116. The entropy pool state 116 may be configured, for example, as a portion of memory. In some embodiments, the entropy pool state 116 may be embodied in the buffer of the weighted entropy combiner 114. Updates to the entropy pool state 116 may happen synchronously or asynchronously. The amount of entropy transferred out of the buffer is tracked. As new data samples come in to the weighted entropy combiner 114, the data in the buffer may be rehashed. The weighted entropy combiner 114 may provide data to the entropy pool state 116 on either a push or a pull basis.

Data from the entropy pool state 116 is available to various entropy responders 118 120. An unblocking entropy responder 118, such as, for example, some PRNG APIs, is one which will respond with data whether or not the entropy pool state 116 contains sufficient entropy to meet a current request. A blocking entropy responder 120 will wait for the sufficient entropy to be gathered in the entropy pool state 116 before responding to a request for entropy. If all of the entropy sources 102, 104, 106 are asynchronous, a blocking entropy responder 120 may block for an indefinite period. Thus, it may be preferable in systems with blocking entropy responders 120 to provide at least one synchronous entropy source. As entropy is given out to entropy responders 118 120, the amount of entropy in the entropy pool state 116 is reduced.

The entropy pool state 116 may be saved to an entropy pool state file 122. The entropy pool service loads a previously saved entropy pool state file 122 at startup. By restoring a saved entropy pool state 116, the entropy pool service is able to provide good entropy immediately after startup, without waiting for entropy sources 102, 104, 106 to generate usable entropy. The entropy pool state file 122 may be saved on a system-wide or a per-user basis and may be refreshed at various times including at shutdown. The entropy pool state file 122 may be saved, for example, in a system registry key or in a protected file. File protections may include such measures as access controls, encryption, integrity checking. If the entropy pool state file 122 is missing or corrupted, the system may reinitialize the file, for example such as it would at a first-time initialization.

Figure 3:
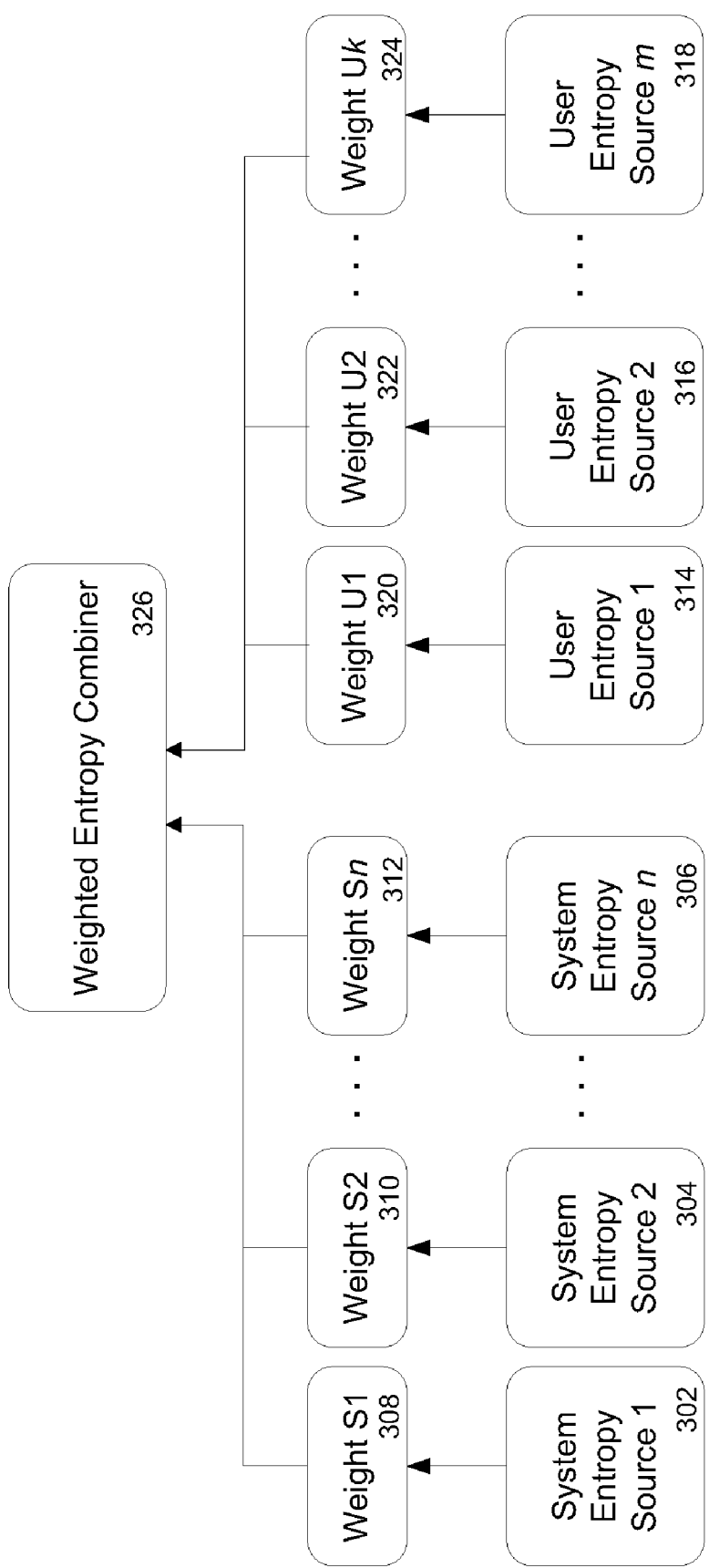
FIG. 3 is a block diagram of a weighted entropy combiner having system entropy sources and user entropy sources.

An interface may be provided to allow entropy sources to be added to the entropy pool service. In some embodiments, an interface for users to add weighted user entropy sources is provided. FIG. 3 depicts a portion of an entropy pool service having entropy sources provided by both the system and by one or more users. A number of system entropy sources 302, 304, 306 are provided along with their associated weights 308, 310, 312. User entropy sources 314, 316, 318 have been added to the entropy pool service. Each user entropy source 314, 316, 318 may be synchronous, asynchronous, or bi-modal, and is assigned corresponding weights 320, 322, 324. The weights may be assigned by the user or may be assigned by the system. Generally, weights should be assigned with consideration of various qualities of the sources as they relate to the amount of entropy expected to be contained in data from the sources.

If a user entropy source 314, 316, 318 is trusted, its data, combined with the corresponding weight 320, 322, 324 may be fed to the weighted entropy combiner 326 in the manner described in relation to FIG. 1. Alternatively, data from a user entropy source 314, 316, 318 can be mixed, for example by hashing, with data from a system entropy source 302, 304, 306 before being fed to the combiner 326.

Figure 4:
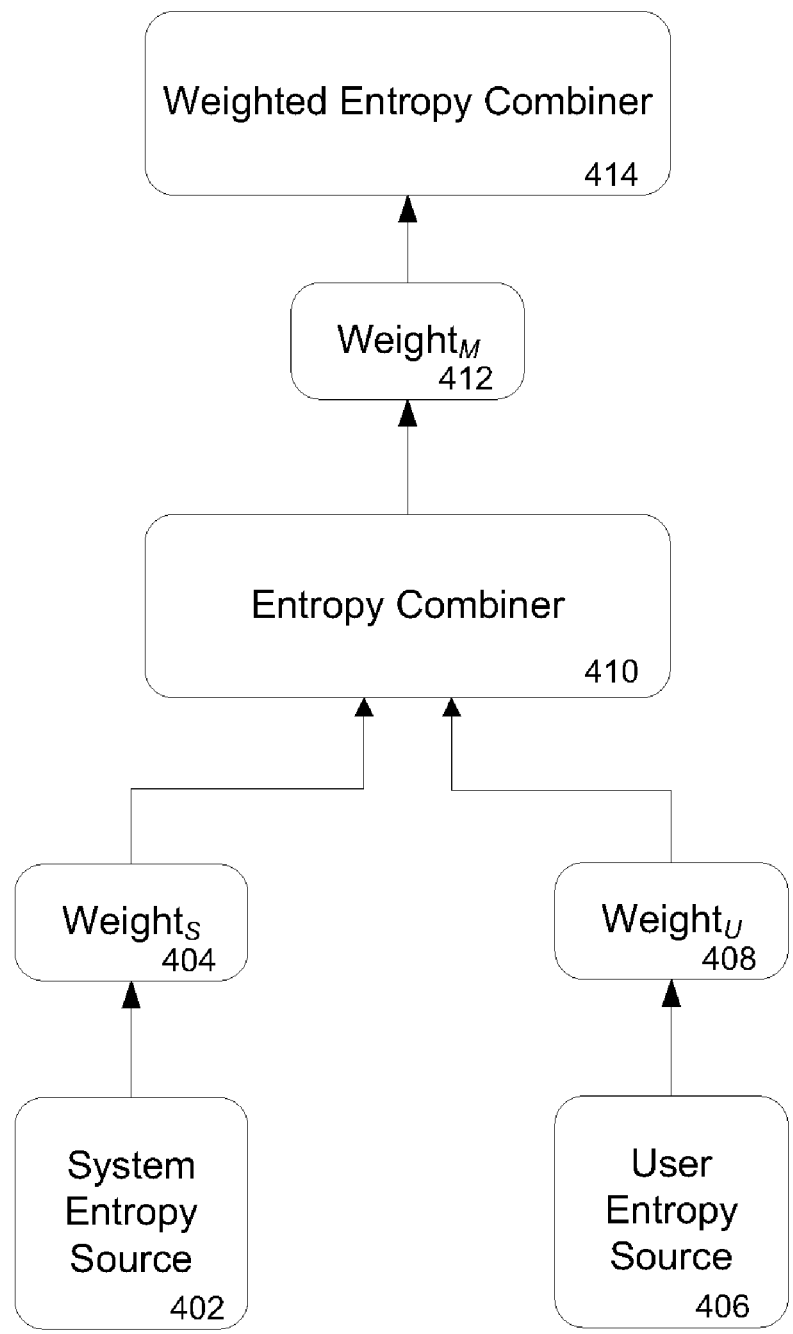
FIG. 4 is a block diagram of a weighted entropy combiner having an entropy mixer, a system entropy source, and a user entropy source.

FIG. 4 depicts a block diagram for mixing a data sample from a system entropy source 402 having Weight$_S$ 404 with a data sample from a user entropy source 406 having Weight$_U$ 408. An entropy mixer 410 receives the data samples and combines them, for example by hashing them together or combining the data samples using an exclusive or function. If a data sample from a system entropy source 402 having x bits of entropy is hashed with a data sample from a user entropy source 406 having y bits of entropy, the combined, hashed data will contain x+y bits of entropy. If either (but not both) of the entropy sources being combined has been compromised, and thus contains no usable entropy, the hashed data will still contain at least min(x,y) bits of usable entropy.

The combined data sample is assigned a Weight$_M$ 412. For example, if both the system entropy source 402 and the user entropy source 406 are trusted, the Weight$_M$ of a hashed, combined data sample from the entropy mixer 410 may be a weighted combination of Weight$_S$ 404 and Weight$_U$ 408, as in, for example:

$$Weight_M = \frac{D_S * Weight_S + D_U * Weight_U}{D_M}$$

where Weight$_M$, Weight$_S$, and Weight$_U$ are the weights (in bits of entropy per bit of data) assigned to the combined data sample generated by the entropy mixer 410, the data sample from the system entropy source 402, and the data sample from the user entropy source 406 respectively. $D_S$, $D_U$, and $D_M$ are the sizes (in bits) of the data sample from the system entropy source 402, the data sample from the user entropy source 406, and the mixed data sample, respectively. Alternatively, the assignment of Weight$_M$ may account for the possibility that one or the other of the entropy sources 402, 406 may be compromised, as in, for example:

$$W_M = \min\left[\frac{D_S * Weight_S}{D_M}, \frac{D_U * Weight_U}{D_M}\right]$$

In more general terms, especially in cases where $D_M$ is smaller than $D_S$ and $D_U$, the weight in the combined entropy pool would need to be capped. The cap is the number of bits in the entropy pool. In asynchronous case, entropy may be supplied to the pool continually. Rather than expanding the buffer length when the buffer is full and the data in the buffer has full entropy, i.e., one bit per bit of entropy, one may, by way of examples: ignore incoming entropy until some entropy is taken from the buffer, or combine new entropy into the buffer without changing the weight or count of entropy in the buffer, or temporarily increase the buffer length and combine incoming entropy into the expanded buffer.

These are just examples of mixing and assignments of weights to mixed samples. It is contemplated that any technique of mixing data samples that preserves some of the entropy from the samples and any method of assigning a weight to the combined sample may be used and that data samples from any number of system entropy sources 402 and user entropy sources 406, from any number of users, may be mixed.

Figure 5:
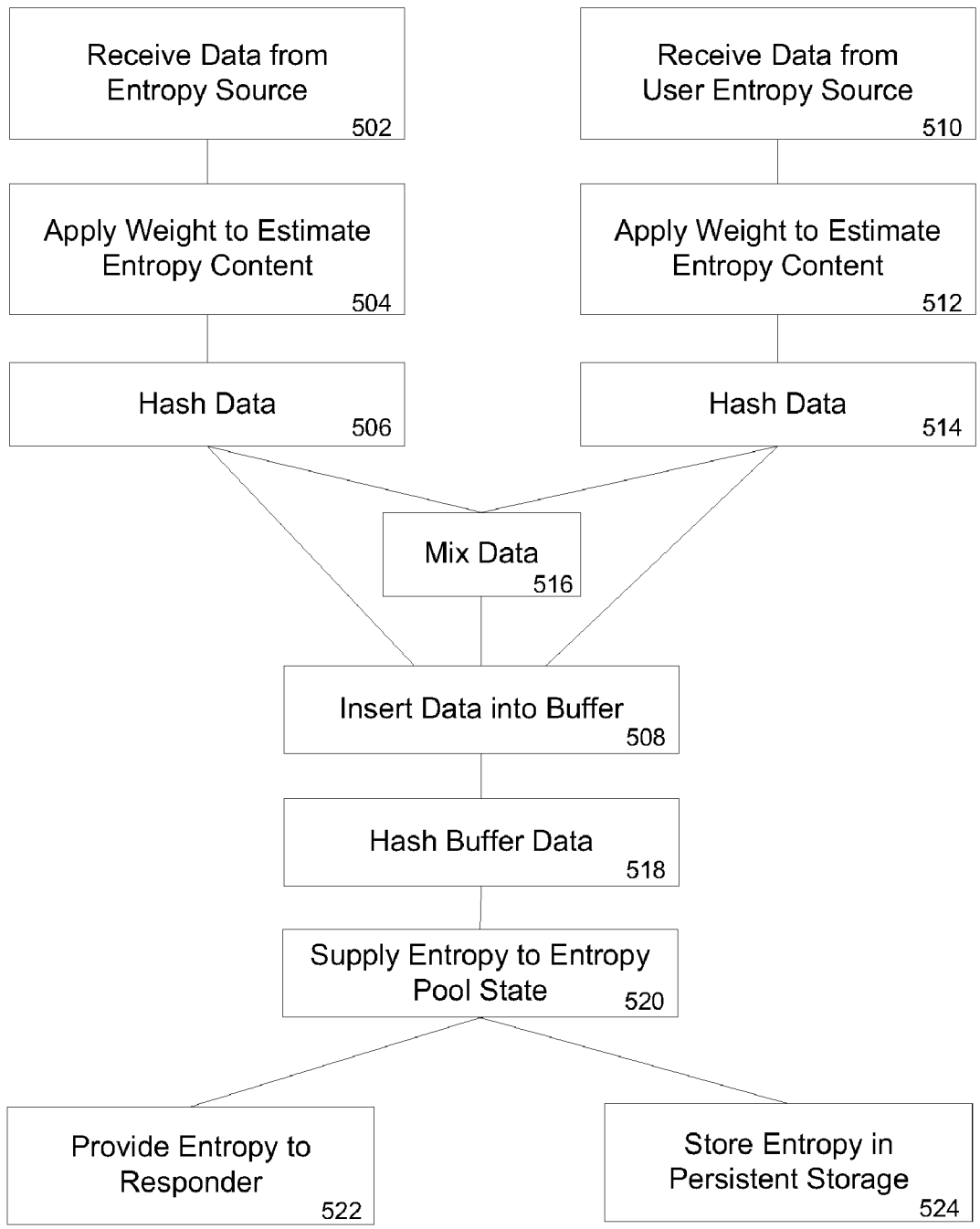
FIG. 5 is a flow diagram of a method of operating a weighted entropy pool service.

FIG. 5 depicts a flow diagram of an embodiment of a method of using a system as described herein. Data is received from an entropy source 502. The data may be communicated asynchronously or synchronously. A weight associated with the entropy source is applied to the data to estimate the entropy content of the data 504 as described above. An entropy source may have different weights associated with it when operating in an asynchronous mode or a synchronous mode. The received data is optionally hashed 506, as described above, so as to distribute its entropy content throughout the data. The data is then inserted into a buffer 508. The whole data may be inserted in the buffer, or a quantity representing the entropy content of the data may be extracted and inserted in the buffer.

If a user entropy source is supplying data, the data is received 510, a weight associated with the user entropy source and communication mode is applied 512, and the data is optionally hashed 514. The resulting data may be inserted into a buffer 508, or may first be mixed with data from a system entropy source 516 such as, for example, described above in relation to FIG. 4.

The data in the buffer may be hashed 518 to distribute entropy contained in the buffer throughout the buffer. If, for example, an entropy source is compromised, hashing the buffer helps to ensure that data from the compromised source is mixed with good entropy from other sources and that a stream of data solely from the compromised source does not issue from the buffer. Entropy from the buffer is supplied to an entropy pool state 520, for example as described above with respect to FIG. 1.

Entropy from the entropy pool state may be supplied to an entropy responder 522 such as for example an unblocking entropy responder 118 (FIG. 1) or a blocking entropy responder 120 (FIG. 1). The amount of entropy in the entropy pool state is tracked, and that amount is reduced by the amount of entropy supplied to the entropy responder.

The data in the entropy pool state may be stored in a persistent storage 524, such as, for example, an entropy pool state file as described in connection with FIG. 1. Data in the persistent storage will persist across system restarts and will be available to provide entropy immediately upon restart.

While the present disclosure has been described in connection with various embodiments, illustrated in the various figures, it is understood that similar aspects may be used or modifications and additions may be made to the described aspects of the disclosed embodiments for performing the same function of the present disclosure without deviating therefrom. Other equivalent mechanisms to the described aspects are also contemplated by the teachings herein. Therefore, the present disclosure should not be limited to any single aspect, but rather construed in breadth and scope in accordance with the appended claims.

What is claimed:

1. An entropy service system comprising:
   a collection of entropy sources,
   wherein each entropy source in the collection of entropy sources is associated with a respective weight, each said respective weight being related to an estimate of an amount of entropy in data supplied by the entropy source associated with the weight; and
   a memory configured to store data from the entropy sources.

2. A system as recited in claim 1, further comprising:
   an interface configured to enable a user to link a user entropy source to the entropy service system.

3. A system as recited in claim 2, further comprising:
   a user entropy source linked to the entropy system by the interface; and
   a weight associated with data from the user entropy source.

4. A system as recited in claim 3, further comprising:
a data link for providing entropy to a computing system; and
an entropy mixer for mixing entropy from a first entropy source associated with a resource of the computing system and a second entropy source linked to the entropy service system by the interface.

5. A system as recited in claim 1, further comprising:
an entropy distributor for distributing entropy contained in data stored in the memory throughout the data.

6. A system as recited in claim 1, further comprising:
a persistent entropy state storage for storing entropy, said entropy state storage configured to persist across a system restart.

7. A system as recited in claim 1, wherein an entropy source is configured to operate in both a synchronous mode and an asynchronous mode and further comprising a first weight associated with data from the entropy source operating in synchronous mode and a second weight associated with data from the entropy source operating in asynchronous mode.

8. A system as recited in claim 1, further comprising:
an entropy analyzer for computing the amount of entropy in data from an entropy source.

9. A computer-implemented method comprising:
receiving data from a plurality of entropy sources;
estimating a quantity of entropy contained in the received data from each entropy source of the plurality of entropy sources by applying a weight associated with each entropy source; and
storing data correlative of the received data in a computer memory associated with an entropy service system.

10. A computer-implemented method as recited in claim 9, further comprising:
supplying data containing entropy to a consumer of entropy; and
tracking a quantity of entropy remaining in the entropy service system after supplying the data.

11. A computer-implemented method as recited in claim 9, wherein storing data correlative of the received data comprises:
applying a hashing function to the received data to generate hashed data; and
storing the hashed data in a computer memory.

12. A computer-implemented method as recited in claim 9, wherein storing data correlative of the received data comprises:
applying a hashing function to the received data to generate hashed data;
extracting a quantity of data from the hashed data approximately equal to the estimated quantity of entropy contained in the data from the entropy source; and
storing the extracted data in a computer memory.

13. A computer-implemented method as recited in claim 9, further comprising:
providing an interface configured to enable a user to link a user entropy source to the entropy service system.

14. A computer-implemented method as recited in claim 12, further comprising:
receiving data from a user entropy source;
applying a weight associated with the user entropy source to estimate a quantity of entropy contained in the data from the user entropy source;
mixing the data received from the user entropy source with data received from the first entropy source to generate mixed data; and
wherein storing data correlative of the received data comprises storing data correlative of the mixed data in a computer memory associated with the entropy service system.

15. A computer-implemented method as recited in claim 9, further comprising:
saving data from the computer memory associated with the entropy service system in a persistent entropy state storage configured to persist across a system restart.

16. A computer readable storage medium comprising computer executable instructions for:
receiving data from a plurality of entropy sources; and
estimating a quantity of entropy contained in the received data by applying a weight associated with each entropy source of the plurality of entropy sources to the data received from each entropy source.

17. A computer readable storage medium as recited in claim 16, wherein the computer-executable instructions further comprise instructions for:
providing an interface configured to enable a user to link a user entropy source to an entropy service system.

18. A computer readable storage medium as recited in claim 17, wherein the computer-executable instructions further comprise instructions for:
mixing data from a plurality of entropy sources.

19. A computer readable storage medium as recited in claim 16, wherein the computer-executable instructions further comprise instructions for:
saving data containing accumulated entropy in a persistent entropy state storage configured to persist across a system restart.

20. A computer readable storage medium as recited in claim 16, wherein the computer-executable instructions further comprise instructions for:
analyzing the received data to compute a quantity of entropy contained in the received data.

* * * * *